United States Patent [19]

Hennessy et al.

[11] 4,352,245

[45] Oct. 5, 1982

[54] DISTANCE INDICATING DEVICES

[75] Inventors: John B. Hennessy, Ahuroa, North Auckland; Rodney J. Twizell, Auckland, both of New Zealand

[73] Assignees: John B. Hennessy, North Auckland; The Development Finance Corporation of New Zealand, Wellington, both of New Zealand

[21] Appl. No.: 200,338

[22] Filed: Oct. 24, 1980

[30] Foreign Application Priority Data

Oct. 30, 1979 [NZ] New Zealand .................. 190605

[51] Int. Cl.³ .................. G01B 5/02; G01B 11/06
[52] U.S. Cl. .................. 33/169 B; 33/125 C; 365/149
[58] Field of Search .................. 33/169 B, 125 C; 365/149

[56] References Cited

U.S. PATENT DOCUMENTS

| 2,763,935 | 9/1956 | Whaley et al. | 33/169 B |
| 3,142,822 | 7/1964 | Martin | 365/149 |
| 3,171,986 | 2/1965 | Bonner et al. | 365/149 |
| 3,500,342 | 3/1970 | Bissett et al. | 365/149 |
| 3,512,140 | 5/1970 | Yokozawa et al. | 365/149 |
| 4,078,313 | 3/1978 | Hennessy | 33/169 B |
| 4,195,413 | 4/1980 | Haraguchi et al. | 33/169 B |
| 4,270,274 | 6/1981 | Hennessy | 33/169 B |

Primary Examiner—William D. Martin, Jr.
Attorney, Agent, or Firm—Wenderoth, Lind & Ponack

[57] ABSTRACT

A distance indicating device comprises a probe having therein a light source and light sensitive element to receive light reflected from the surroundings of the probe. A reference point is movable relative to the probe. The light sensitive element gives rise to an electric signal. A first storage means stores a signal representing the maximum reflected light returned to the light sensitive element. A second storage means stores a signal representing the light returned to the light sensitive element representing the minimum reflected light. A selection means selects a signal level between the maximum and minimum stored signals' and a measuring element measures the distance between the reference point and a further reference point, associated with the probe, when the signal level reaches the selected signal level.

3 Claims, 6 Drawing Figures

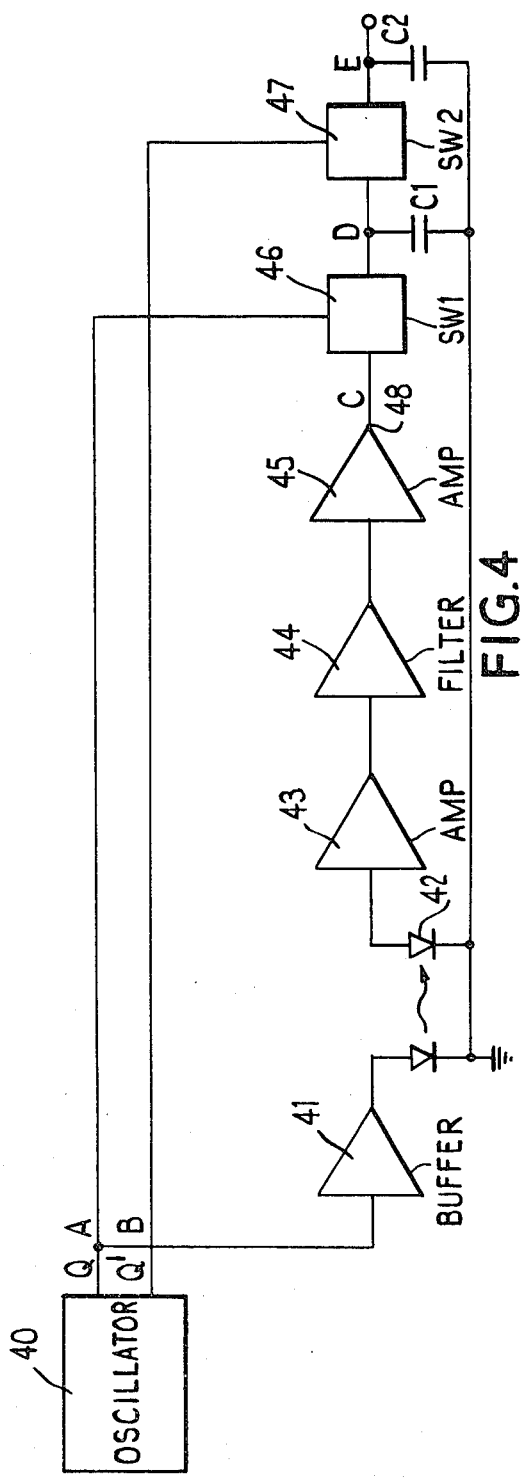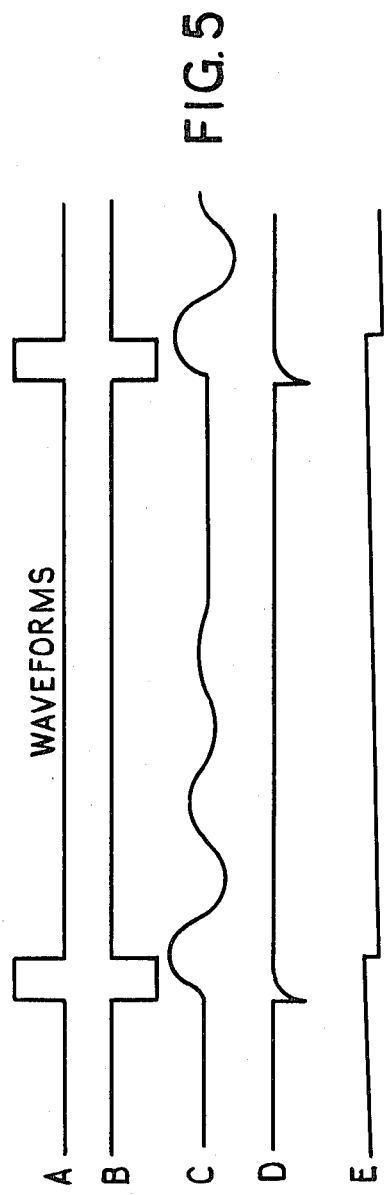

DISTANCE INDICATING DEVICES

BACKGROUND OF THE INVENTION

This invention relates to distance indicating devices.

In distance indicatiors usable for example for measuring the depth of a fat layer and and including a light source and detection cell, the detection cell itself occupies a finite space. Thus as the cell moves across a fat/meat interface a sudden high to low or low to high change in signal level is not found but rather a more gradual change occurs. This tendency to a gradual change is increased by light diffusion into the meat and fat. Thus the change from a high to a low signal level, or vice-versa, may occur over a distance of about 2 mm to 4 mm. This can cause difficulties when a measurement of precise fat depth is required, which is frequently the case especially where fat depth forms a basis for payment for a carcass.

SUMMARY OF THE INVENTION

It is an object of the present invention to provide a distance indicating device which will obviate or minimise the foregoing disadvantages or which will at least provide the public with a useful choice.

Accordingly the invention includes a distance indicating device comprising a probe, a light source and light sensitive element to receive light reflected from the surroundings of the probe, each associated with the probe, a reference point movable relative to the probe, the light sensitive element giving rise to an electric signal, first storage means to store a signal representing the maximum reflected light returned to the light sensitive element, second storage means to store a signal representing the light returned to the light sensitive element representing the minimum reflected light, selection means to select a signal level between the maximum and minimum storage signals and measuring means to measure the distance between the reference point and a further reference point, associated with the probe, when the signal level reaches said selected signal level.

To those skilled in the art to which this invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

One preferred form of the invention will now be described with reference to the accompanying drawings in which:

FIG. 4 is a block diagram of an input circuit to provide the input pulse to the circuit of FIG. 2, FIG. 5 are graph representations of waveforms at various points of the circuit of FIG. 4.

DETAILED DESCRIPTION OF THE INVENTION

Figure 1:
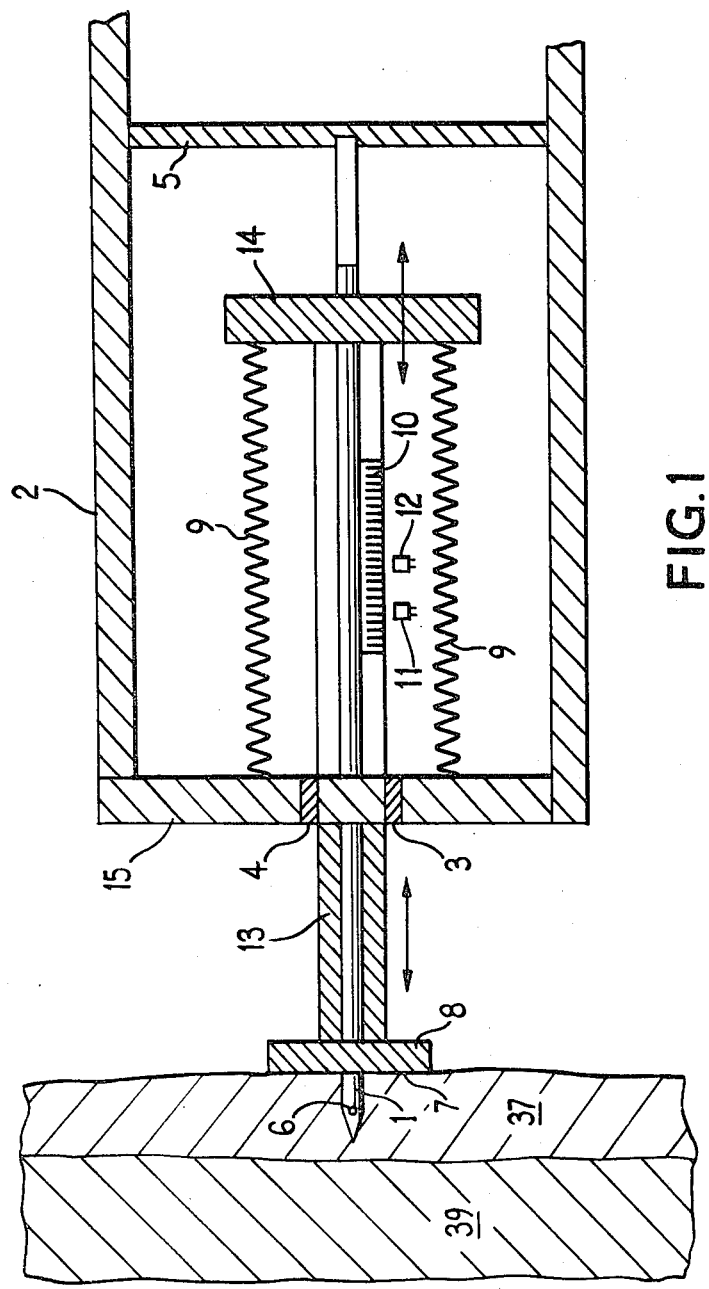
FIG. 1 is a diagrammatic cross sectional view of a distance indicating device according to the invention.

In the preferred form of the invention a distance indicating device is provided which comprises a probe 1 extending from a housing 2 for example, through an aperture 3 which has a bush 4 therein. The probe 1 is preferably rigidly mounted within the housing for example, to a support 5.

Figure 6:
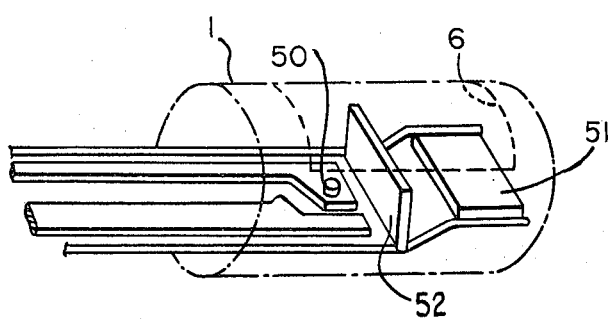
FIG. 6 is a diagrammatic perspective view of part of a lance as used in one embodiment of the invention.

The probe has an aperture 6 therein behind which are positioned, as shown in FIG. 6, a light source 50, preferably a source of monochromic light such as a gallium phosphate green light emitting diode in a green clear lens and a light sensitive element 51 such as a green sensitive silicon photocell, with a dividing wall 52 therebetween.

A reference surface 7 is provided for example, on a plate 8 which is positioned about the probe 1 and the plate 8 is able to be moved for example, by being supported within the housing by springs 9.

A suitable measurement means is provided so that the distance between a reference point associated with the probe, for example the position of the light sensitive element 51, and the reference surface 7 may be determined and this may comprise for example, a grid 10 having a light source 11 positioned on one side thereof and a light sensitive element 12 positioned on the other side thereof, the construction shown in FIG. 1 being representative only.

Thus, the plate 8 may be mounted on a hollow shaft 13 terminating in a back plate 14, the springs 9 being positioned between back plate 14 and for example, the front wall 15 of the housing 2.

The construction will now be described with reference to measuring the fat depth in an animal carcass.

Figure 3:
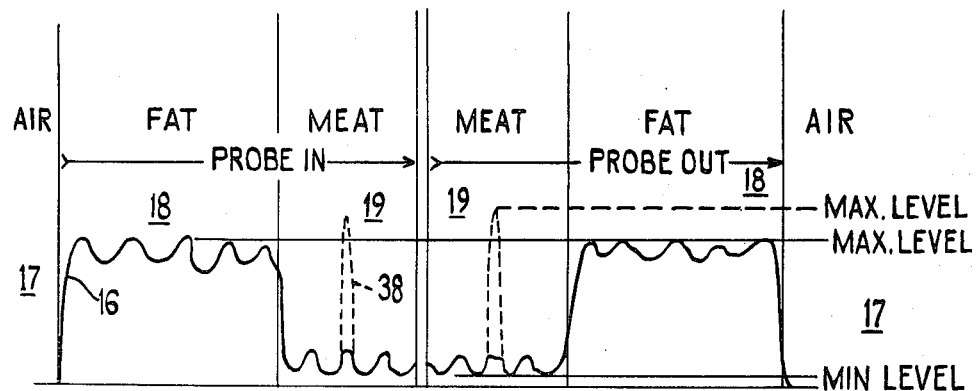
FIG. 3 is a graph of typical signal levels of a distance indicating device according to the invention in use as a fat depth indicator.

Referring to FIG. 3 the line 16 represents a typical amount of reflected light received by the light sensitive element with the probe 1. Thus, initially when the light sensitive element is in air region 17 the signal is low or zero. As the probe enters the fat in the region 18 the signal level increases and with some irregularity reaches a high level.

At the transition into a meat layer 19 the signal level falls as less reflection occurs and as the probe is then withdrawn again through the meat layer 19 the signal level will remain with some irregularity at its minimum level, rising again to a high level at an area 18 and again falling to zero in the area 17.

Figure 2:
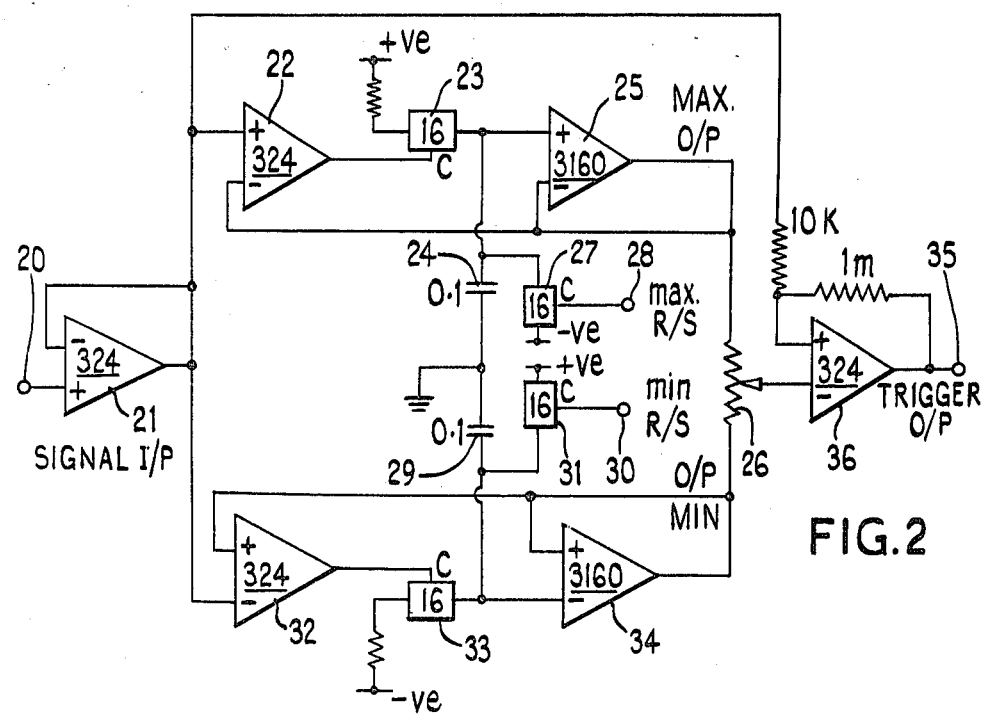
FIG. 2 is a circuit diagram of a trigger circuit to control the distance measuring of the apparatus of FIG. 1.

The amount of reflected light received by the light sensitive element gives rise to an electronic signal which is applied, referring to FIG. 2, to an input terminal 20 where it is fed through a unity gain buffer 21. First and second storage means are provided to store signals representative of the maximum and minimum values of reflected light.

The maximum signal read during the traverse of the probe within the carcass, in the preferred form of the invention, is then treated as follows.

The output from the buffer 21 is fed into a comparator 22 and the output from the comparator 22 is fed into an electronic switch 23 which can be operated in on, off, and partly on positions, is to say, that there will be some period of time taken to change the switch 23 from an 'off' state to an 'on' state in particular.

The output from comparator 22 is fed to the control terminal of the electronic switch 23, the input to the switch 23 coming to this embodiment from a positive terminal.

The output from the switch 23 causes charging of a capacitor 24.

The output voltage across the capacitor 24 is read by a further unity gain buffer 25 which has a high input impedance so as to minimise leakage from the capacitor 24.

The output from the unit gain buffer 25 is fed to a potentiometer 26 and also to the other input of the comparator 22.

Thus this part of the circuit operates as follows:

When the input for example, to the terminal 20 is greater than the output from the buffer 25 a signal is provided to the switch 23 turning the switch 23 at least partly on and thus the capacitor 24 is charged from the positive terminal.

When the output from the first storage capacitor 24 equals or is greater than the input to the terminal 20 the switch 23 is turned off by the comparator 22 and no further charging of the capacitor 24 occurs.

The capacitor 24 may be discharged to the negative terminal through a switch 27 which is similar to the switch 23, the controlling signal being applied to a terminal 28 as will be described later. Thus, a representation of the maximum intensity of returned light to the light sensitive element is stored in the capacitor 24.

In a similar manner a representation of the minimum return signal can be stored in a capacitor 29. In this embodiment if a signal is applied to a terminal 30, the capacitor 29 is charged from the positive terminal through a switch 31.

Comparator 32 is again fed by input 20 and unity gain buffer 21 and the output from comparator 32 controls a switch 33 and a unity gain buffer 34 is provided in the same manner.

When the comparator 32 determines that the output from the second storage capacitor 29 through the unit gain buffer 34 is greater than the input signal at 20 the switch 33 is turned on and the capacitor 29 discharges to the negative terminal, thus reducing the voltage across the capacitor 29 until the comparator 32 turns the switch 33 off when the output voltage from the unity gain buffer 34 is equal to or less than the signal at the terminal 20. A switching voltage between the maximum and minimum voltages in the capacitors 24 and 29 is then selected for example, by operating the potentiometer 26 and for example, this voltage may be midway between the maximum and minimum voltage or otherwise as desired and this will in general depend on the characteristics of the meat as found by experiment. The situation therefore is that a pair of stored stationary potentials are provided in the capacitors 24 and 29.

The situation is therefore that the output on terminal 35 from a final comparator 36 will rise and fall.

The counter, operated for example, by passing of grid 10 past the light sensitive element 12, is continually counting and a resetting circuit is provided between the terminal 35 and the counter so that each time the output from comparator 36 rises, the counter is reset to zero. Thus it is a change in the state, i.e. a positive transition, which causes the counter to be reset.

The resetting pulse applied to the terminals 28 and 30 may be provided from the grid 10 by providing apertures therein through which light can be provided to a light sensitive element to provide the desired pulse.

The resetting pulse to terminal 28 is preferably provided at a point where the probe has entered the fat so that in particular, spurious minimum levels when the probe is in air are avoided.

It is desirable that the minimum level be set as the probe is being withdrawn, that is to say, a resetting pulse be provided to terminal 30 as the probe is being withdrawn from the carcass. This can again be achieved by a suitable aperture in the grid 10.

In order to provide suitable input pulses to the circuit of FIG. 2, circuitry is provided as follows, with reference to FIG. 4. An oscillator 40 is provided which has two out of phase outputs Q and Q'. The output Q drives the light source through a buffer stage 41. The reflected signal is sensed by a light sensitive device such as a photo-sensitive diode 42 which is connected directly to the earth point of an operational amplifier 43. As very little voltage variation occurs across the cell in this configuration its pulse response is not restricted by its own source impedance and internal capacitance. Received pulses are then fed through a band pass filter 44 which is constructed to allow the second harmonic of the received wave form to be passed, the band pass filter also operating to reduce interference and to decrease the front stage circuitry noise. As the filter is AC coupled any DC offset change due, for example, to ambient lighting conditions is removed. The signal is then further amplified through a variable gain stage amplifier 45 so that adjustments for sensitivity variations in for example, the light source such as the light emitting diode, cells and circuit components can be made.

The peak detector circuit operates as follows:

Switch 46 and switch 47 operate out of phase with each other that is to say, when switch 46 is open, switch 47 is closed and vice-versa. When the pulse occurs a rising wave form appears on the amplifier output at 48 this being shown by wave form C in FIG. 5. Switch 46 is closed and switch 47 is open. Capacitor C1 then charges up to the voltage on the output of the amplifier 45 through switch 46. The period of the pulse is adjusted such that the trailing edge corresponds with the peak of the wave form and this can be achieved by varying the width of the output pulses from the oscillator. The shape of the wave form is determined by the characteristics of the band pass filter 44 and the centre frequency of the filter is set so that the maximum amplitude of the output from the filter occurs at the end of the pulse from the oscillator. The capacitors C1 and C2 with the associated switches 46 and 47 are used to store the peak voltage of the wave form. Capacitor C1 follows the output voltage of the amplifier during the on-time of the light source and this is transferred to capacitor C2 when the light source is turned off. Transfer to capacitor C2 occurs through the switching off of switch 46 and the switching on of the switch 47 by the alternative pulses Q and Q'. This corresponds to the peak of filtered wave form and the voltage on C2 is then passed through the high impedance buffer 21 to the self-adjusting trigger circuit herein described.

The light source such as a green light emitting diode is pulsed with high current at a constant rate and a low mark/space ratio is used so that the peak light output for a given mean power is increased, so that the light pulses can be distinguished from ambient lighting conditions by using AC coupling and so that synchronized detection can be used to avoid intererence which occurs at any other time when the light is being transmitted.

The use of the invention is as follows:

The use in the preferred form occurs in that as the probe 1 is inserted into a fat layer 18 or 37 the light sensitive element gives rise to a high signal which causes storage to occur on capacitor 24. Each time the input from the terminal 20 rises above the capacitor 24, the capacitor 24 is further charged as above described. On withdrawing of the probe a minimum level is set on the capacitor 29 as above described, the minimum circuitry having been reset while the probe 6 is being inserted into a carcass.

When the minimum level has been set in particular, as the probe is withdrawn and the signal level at terminal 20 rises, counting of the grid begins. This will occur several times during the operation but the counter will be reset at each new minimum level so that the final counting will only begin at the selected level between the maximum and minimum levels. If a fat layer indicated for example by signal peaks 38 (FIG. 3) is found in the meat layer 39, corresponding to area 19 in FIG. 1, the maximum levels will be again reset as shown in FIG. 3 but the depth of the outer fat layer only will be recorded by the counting device.

Thus it can be seen that a depth indicating device is provided which at least in the preferred form of the invention enables the depth of fat on a carcass to be measured to a satisfactory level, as the effects of the size of the detection cell at the probe and diffusion of the light into the meat and fat can be compensated for in a ready manner. Correct selection of the trigger point between the maximum and minimum voltages enables the true interface to be recorded or at least approximated.

What is claimed is:

1. A distance measuring device comprising:
   a probe;
   a first reference point associated with said probe;
   a second reference point movable relative to said probe;
   a light source associated with said probe;
   light sensitive element means, associated with said probe, for receiving light from said source reflected from the surroundings of said probe and for generating an electrical signal representative of the level of said reflected light;
   a first storage means for storing a first signal representative of the maximum reflected light received by said light sensitive element means;
   second storage means for storing a second signal indicative of the light received by said light sensitive element means representative of the minimum level of reflected light;
   selection means for selecting a signal level between said stored first and second signals; and
   measuring means for measuring the distance between said first and second reference points when said electrical signal from said light sensitive element means reaches the level of said selected signal.

2. A device as claimed in claim 1, wherein said first and second storage means comprise first and second capacitors, respectively, and further comprising means for increasing the charge on said first capacitor whenever the input voltage is greater than the output voltage therefrom, and means for decreasing the charge on said second capacitor whenever said input voltage is less than the output voltage therefrom.

3. A device as claimed in claim 2, wherein said increasing means comprises first electronic switch means operatively connected to said first capacitor for controlling the charging thereof, and first comparator circuit means for comparing said output voltage from said first capacitor with said input voltage, and for, upon determining that said output voltage from said first capacitor is less than said input voltage, switching said first electronic switch means such that the charge on said first capacitor is increased, and said decreasing means comprises second electronic switch means operatively connected to said second capacitor for controlling the discharging thereof, and second comparator circuit means for comparing said output voltage from said second capacitor with said input voltage, and for, upon determining that said input voltage is less than said output voltage from said second capacitor, switching said second electronic switch means to allow discharging of said second capacitor.

* * * * *